April 11, 1950 — B. R. ROSE ET AL — 2,503,415

EARTH SCRAPER

Filed Nov. 5, 1946

Inventors
BRUCE R. ROSE
GEORGE M. ALLEN
By Reynolds & Beach
Attorneys

Patented Apr. 11, 1950

2,503,415

UNITED STATES PATENT OFFICE 2,503,415

EARTH SCRAPER

Bruce R. Rose, Yakima, and George M. Allen, near Yakima, Wash.

Application November 5, 1946, Serial No. 707,838

7 Claims. (Cl. 37—140)

The present invention concerns an earth scraper of the Fresno type, in which a scraper bowl dragged by a draft yoke behind a tractor is rotatable at will about end trunnions for dumping and leveling its load. More particularly the present invention is concerned with mechanism for tilting the bowl from a non-scraping to a scraping attitude independently of the bowl-rotating means.

The control mechanism by which such a scraper is tilted to pick up earth must be readily operated by the tractor operator, some distance ahead of the bowl. The mechanism must be simple and rugged, and must be so mounted and carried that it is kept clear of obstructions below the draft yoke, and of the earth collected within and ahead of the scraper. Such operating mechanism must act positively in a direction to engage the scraper's blade with the earth, yet the scraper must be held uptilted, and when filled must automatically disengage its blade, through the operation of spring means, in opposition to the tractive pull. The control must be sensitive, to balance parts with the blade upraised, yet not so forcefully that the blade may not be tilted downwardly by the application of a small force. It must be inexpensive to construct and easy of access. Moreover, while the scraper bowl is in effect fixed to the draft linkage during scraping operations, releasable means must be provided, which, upon release, will permit the scraper bowl to roll or tumble over, for deposit of its load, and such release mechanism must be simple and clear of interference, either with the scraping operation or with the bowl tilting mechanism.

The present invention has for its object the provision of mechanism well adapted to the ends in view, as indicated above.

The invention is shown in the accompanying drawings in a typical and practicable form, such as will be explained more fully hereinafter, and the principles whereof will be set forth in the appended claims.

Figure 1:
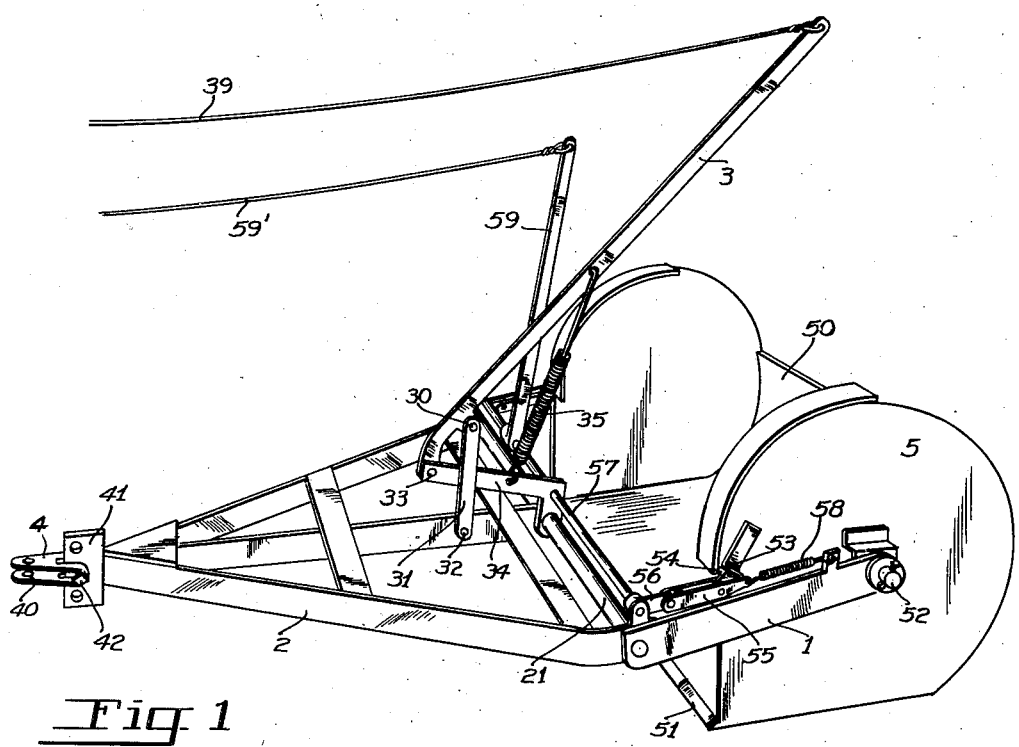
Figure 2:
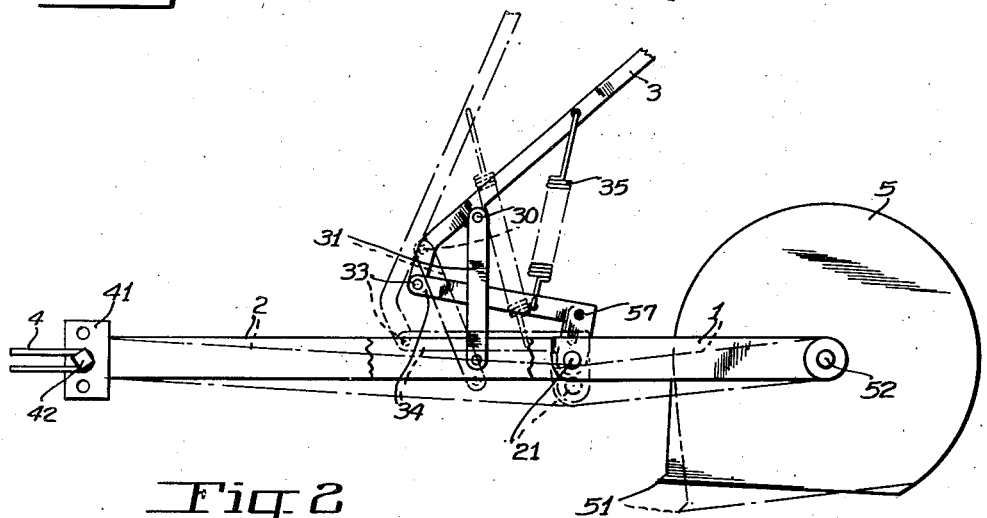

Figure 1 is a perspective view of such a scraper in operative position as it would be drawn behind a tractor, at the left, and Figure 2 is a side elevation thereof, partly broken away, and with the bowl release mechanism omitted for better illustration of the operating mechanism, two positions of the parts being shown, in full lines and in dot-dash lines, respectively.

The bowl 5 of the scraper is of conventional design, closed at the rear, as indicated at 50, and being of near-cylindrical shape, with, however, a substantially flat bottom terminating at its forward end in a transversely extending, forwardly directed scraper blade 51. The bowl is mounted to a draft yoke or linkage, shortly to be described, by trunnions 52 centrally located at its opposite ends, about which it rotates for dumping.

The draft yoke is arranged at its forward end for connection to a tractor, and a hitch comprising the clevis 4, vertically apertured at 40 for reception of a draft pin, permits sidewise swinging with respect to the tractor, while a vertical plate 41 joined to the clevis 4 by a pin 42 permits rocking about a transverse horizontal axis, the purpose being to permit the draft linkage to rise and fall vertically, and to swing laterally, with respect to the tractor and the tractor hitch.

The draft yoke or linkage is articulated, and in the form shown consists of a rear arm or arms 1, connected to the bowl at the trunnions 52 and extending forwardly to a point in advance of the bowl, and a forward arm 2 which normally would be spread at its rear end to connect with the rear arms 1. The connection between the arms 1 and 2 is by means of a transverse horizontal pivot bar 21, which is welded to arms 1, and about which arms 2 may swing. It can be seen that if the bowl 5 is substantially or in effect fixed to the rear arm 1, as it is normally, by means which will be described presently, it will rock if the rear arm is rocked, and it will further be evident that the rear arm 1 can be rocked downwardly by depression of the pivot bar 21 that is, by depression of the rear end of arms 2, and, conversely, the rear arm 1 will be rocked upwardly by upward movement of the pivot bar 21 at the rear end of arms 2.

The means by which the bowl 5 is, in effect, fixed normally to the bowl 5 includes a stop 53 fixed to the end of the bowl, and a cooperating stop 54 carried by the draft yoke. The stop 54 is secured to a link 55, carried upon the normally horizontal arm 56, fast upon the rock shaft 57, which rock shaft is journaled in the arms 1, in effect. A tension spring 58 reacts between the link 55 and the arm 1 to maintain the stop 54 in position to engage the stop 53 and thus to prevent rotation of the bowl so long as the latter is being drawn forwardly. Release of the stop 54 from the stop 53 may be accomplished by rocking the rock shaft 57 under the influence of the release lever 59, secured upon the rock shaft, and operable by a release line 59' extending forwardly to the tractor operator's seat.

The operating mechanism for governing the degree of tilting of the bowl to engage its blade 51 with the earth comprises an upright operating lever 3 having a fulcrum at 30. This fulcrum is carried by one of the members of the draft linkage at a point somewhat distant from the pivot axis defined by the bar 21. For example, the fulcrum 30 is formed by the upper end of an upright link 31 pivotally mounted at 32 upon a portion of the forward draft arm 2.

The lower end of the operating lever 3 is pivotally connected at 33, ahead of the link 31, to the forward end of a forward effective extension 34 of arms 1, the lower rear end of which is welded rigidly to the pivot bar 21. The link 31 and extension 34 cross one another. In effect the pivot at 33 directly connects lever 3 to the foremost end of arms 1. Any downward pressure at 33 tilts the scraper blade 51 downwardly; any upward force acting at 33 tilts the blade upwardly. Upward force at that point is produced by the tension spring 35, reacting between the lever 3 at a point behind the fulcrum 30, and the effective extension 34 of the arms 1; the factors producing a downward pressure will be explained below.

The forces acting upon the bowl to produce a torque about the axis of its trunnions 52 vary as its attitude and its loading vary, and as those factors are affected in the downwardly-tilting sense by the lever 3 pressing downwardly at 33, or in the upwardly tilting sense by the spring 35 pulling upwardly. When the bowl is unloaded, the tractive forces acting upon the bowl's bottom tend to tilt the bowl so that its blade will dig in, but these forces are relatively slight, and are resisted by the force of the spring 35, reacting on a long moment arm behind the fulcrum 30 of the lever 3, against a similar moment arm of the bowl-tilting forces acting at 33 upon the lever 3, so that normally the uptilted bowl rides on the rear of its bottm, blades 51 out of contact with the earth, and the arms 2 and 1 not wholly in alignment. To dig in, a slight pull forwardly on lever 3, from the tractor operator's station through the line 39, reacts through link 31, in opposition to spring 35, tending to depress the rear arm 1 about the trunnions 52 as an axis, at the same time pulling up on the forward arm 2 through the link 31, which is pivoted at 32 to the forward arm. At the same time, the link 31 swings forwardly, towards the pivot at 33, thereby in effect lessening the moment arm between 30 and 33, without materially affecting the other moment arms involved. Thereby, although in relaxed positions the spring 35 tends to maintain parts in equilibrium, its force is readily overcome by the change in moment-arm relationship, and the bowl and its blade 51 are readily tilted downwardly to dig. After the blade 51 once digs in, only the tractive effort tending to align the arms 2 and 1, with some slight assistance from the spring 35, resists the further downtilting of the bowl at first. As the bowl fills, the earth which collects against the rear wall 50 creates a counter-torque, tending to tilt the bowl upwardly, and eventually this counter-torque, with the ever-increasing tractive effort, tilts the bowl upwardly far enough to disengage its blade from the earth. Thereafter the loaded bowl, uptilted, rides upon its rear edge until the release of the stops 54 permits it to roll over and discharge.

It will be noted that all this operating linkage is above and ahead of the scraper, where it is out of the way of obstructions beneath the draft linkage, and of dirt collected in or ahead of the scraper. The arrangement is quite sensitive, and the amount of force at the line 39 required to effect tilting of the bowl 5 and its blade 51 is slight.

It will be noted that the rock shaft 57 lies closely adjacent the pivot bar 21. It might, indeed, coincide therewith, but it is preferred to keep them separate, though closely adjacent. By this arrangement tilting of the scraper bowl does not in any way affect the engagement of the stops 53, 54, yet in any tilted position of the bowl the stops may be disengaged to permit the bowl to tumble over about the trunnions 52 for release of its load. Re-engagement of the stops 53, 54 occurs upon completion of 360° rotation of the bowl.

We claim as our invention:

1. An earth scraper comprising a near-cylindrical bowl having a forwardly directed scraper blade along its bottom; an articulated draft linkage, the parts whereof are hingedly connected about a transverse horizontal axis; the bowl being connected to the rearmost member of said draft linkage, to tilt with the latter; an operating lever fulcrumed upon one member of said draft linkage; and operatively connected to depress the hinge connection of the draft linkage to produce a downward tilting of the rearmost member of the draft linkage, and of the scraper blade, upon rocking of the upper end of said operating lever forwardly about its fulcrum, and an extension spring reacting between the operating lever and the draft linkage to resist such forward rocking of the operating lever.

2. An earth scraper comprising a bowl having a forwardly directed scraper blade along its bottom; a draft yoke including a rear arm fixed to and projecting forwardly from the bowl, above said blade, and a forward arm pivotally connected to the rear arm along a transverse horizontal axis, the rear arm having a rigid extension forwardly of such axis; bowl-tilting means including a generally upright but rearwardly inclined lever pivoted by its lower, forward end upon the forward extension of said rear arm, and a link whereon the lever is fulcrumed at a point spaced from such lower, forward end, the link extending thence downwardly and pivoted upon the forward arm, forwardly of the pivotal connection between the arms of the draft yoke, whereby a forward pull upon said lever depresses the latter pivotal connection, and displaces said link forwardly towards the pivot of the lever upon the forward extension; and resilient means urging the parts to return to their initial positions.

3. An earth scraper as in claim 2, the resilient means comprising an extension spring interconnecting the lever, at a point opposite its fulcrum from its connection to the forward extension, and said forward extension.

4. An earth scraper as in claim 2, wherein the bowl is journaled to rotate about an axis supported by the rear arm of the draft yoke, a stop carried by the bowl, a complemental stop carried wholly upon the rear arm, and normally resiliently held in position to engage the bowl-carried stop to prevent the bowl's rotation, and means carried wholly by the rear arm to shift the arm-carried stop to disengaged position, for rotation of the bowl.

5. An earth scraper comprising a transversely disposed, elongated, near-cylindrical bowl having a scraper blade forwardly directed along its bottom, and a rear wall; a draft yoke including rear arms whereon the bowl is journaled in the vicinity of the bowl's axis, and thence extending forwardly, a forward arm bifurcated rearwardly from a tractive hitch at its forward end, and pivotally connected at its rear end to the rear arms, the rear arms being rigidly connected by a transverse bar lying in the axis of such pivotal connection; a forward extension rigidly connected to said transverse bar, intermediate the rear arms; a link pivoted upon the forward arm, ahead of the pivotal connection between the arms, and extending upwardly past said forward extension; an operating lever pivoted by its forward end to the forward end of said forward extension, extending thence generally upwardly and rearwardly, and fulcrumed upon said link; an extension spring interconnecting said lever, behind its fulcrum, and the forward extension, behind said link; and releasable means to secure the bowl for tilting with said rear arms, as governed by rocking of said operating lever.

6. An earth scraper as in claim 5, wherein the releasable bowl-securing means includes stops upon the opposite ends of the bowl, a complemental stop carried wholly upon each rear arm, and normally positioned to engage the adjoining bowl-carried stop, a transverse rock shaft carried wholly by the rear arm, and operatively connected to both arm-carried stops, to withdraw them from engagement with the bowl-carried stops, and resilient means to restore the arm-carried stops to engaging position.

7. An earth scraper as in claim 6, the rock shaft being offset from the axis defined by the transverse bar, and having short lever arms at its ends, and links movable lengthwise of the rear arms in opposition to tension springs drawing said short lever arms and links into alignment, constituting the operative connection to the arm-carried stops.

BRUCE R. ROSE.
GEO. M. ALLEN.

REFERENCES CITED

The following references are of record in the file of this patent:

UNITED STATES PATENTS

| Number | Name | Date |
|---|---|---|
| 1,714,118 | Armington | May 21, 1929 |
| 1,724,370 | Rose et al. | Aug. 13, 1929 |
| 1,843,266 | Bird | Feb. 2, 1932 |